Jan. 19, 1960     A. MEIXNER     2,921,510
FOCAL PLANE SHUTTER FOR PHOTOGRAPHIC CAMERAS
Filed May 21, 1957     2 Sheets-Sheet 1
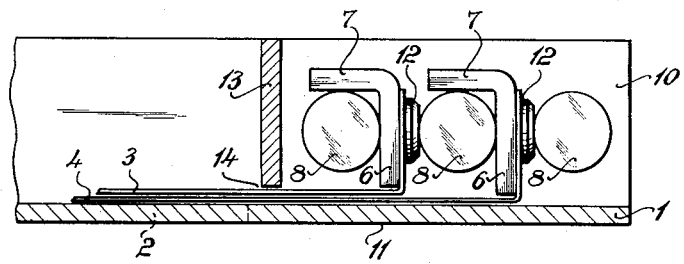
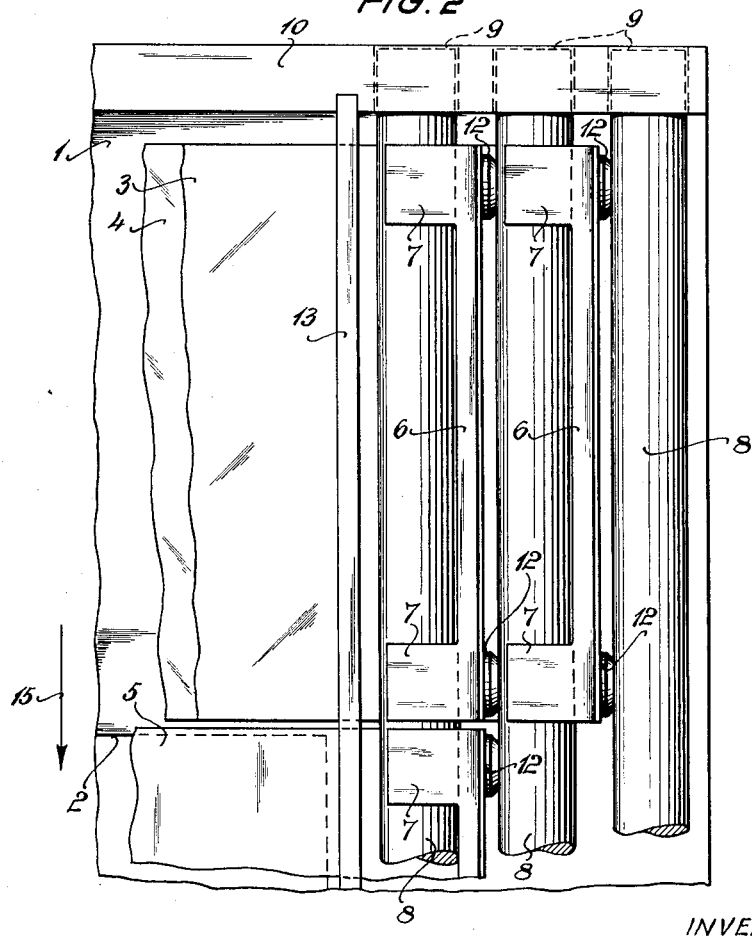
INVENTOR
ALFRED MEIXNER
BY
Mocker Blum
ATTORNEYS

INVENTOR
ALFRED MEIXNER ved from a drawn
United States Patent Office

2,921,510
Patented Jan. 19, 1960

2,921,510

FOCAL PLANE SHUTTER FOR PHOTOGRAPHIC CAMERAS

Alfred Meixner, Braunschweig, Germany, assignor to Voigtlander A.G., Braunschweig, Germany, a corporation of Germany Application May 21, 1957, Serial No. 660,638

Claims priority, application Germany May 26, 1956

5 Claims. (Cl. 95—55)

This invention relates to focal plane shutters for photographic cameras and it has particular relation to shutters of this type, in which the members exposing and closing the image aperture, are rigid slides.

In certain known types of focal plane shutters a single rigid slide is used for exposing and a single rigid slide for closing the image aperture. Furthermore, shutters are also known, in which the exposing slide as well as the closing slide is composed of several individual slides. In the last mentioned cases, the multiple-part slides move from a position in which the parts are telescopically assembled one above the other, or one into the other, to a drawn apart position, or they are moapart position to a position in which the parts are assembled one above the other or one into the other.

In shutters of these types the rigid slides glide in guides provided on both sides of the image aperture. These known guides consist of guide rails or guide slots which are formed between two walls arranged near each other. Thus, the slides and guides lie flat together so that strong frictions must be overcome during movement of the slides. In order to reduce these frictions, in a known focal plane shutter rollers are provided on the rigid slides, said rollers running on the edges of U-shaped guide rails. However, the arrangement of rollers on the slides is troublesome and, moreover, the rollers increase the mass of the slides to be moved. The application and arrangement of guide rollers and guide rails is particularly difficult in cases in which—in order to save space or for other reasons—the slides are supposed to be guided only on one side of the image aperture and simultaneously the exposing slide as well as the closing slide consist of several individual slide members which are movable relative to each other.

The main object of the present invention consists in providing a simple and space-saving guide system for the slides, in which the friction between the parts moving together is reduced as much as possible.

According to the present invention in a focal plane shutter of the above described type, several guide rods—which extend parallel to each other—are arranged along one side of the image aperture and each of the rigid slides is provided with a guide angle member which partially spans one of the guide rods and is at the same time guided between said partially spanned rod and the guide rod which is adjacent to the latter. The guide angle members may be formed by bent portions of the rigid slides. However, it is of advantage if the guide angle members are separate parts fixedly connected with the rigid slides. In this manner, it is possible to make the guide angle members from a material which is different from and stronger than the rigid slides which latter are preferably made of very thin material.

In order to obtain a guide effect which is as much as possible free from play, it is of advantage to guide the guide angle members on or between the guide rods over a distance which corresponds at least to the width of the rigid slides to be guided.

In this type of guiding, the parts to be moved together have point-like or line-like contacts only so that low frictions result. Such frictions can be still further reduced by additional steps. For example, it is of advantage if the parts of the guide angle members which extend between two guide rods, are provided with particular sliding contacts which lie against the guide rods. In this manner an approximately point-like contact between guide means and guided members is attained at the place of contact.

It has been found to be of particular advantage if to the rigid slide to be guided a guide piece is fastened which is perpendicular to the plane of the slide and is guided between two adjacent guide rods by means of sliding contacts arranged on said guide piece and two flaps formed on the ends of said guide piece are bent in a right angle in such a manner that they span one of the guide rods. In this manner an almost point-like contact is attained between guided parts and guide means at all places of contact so that the frictions occurring during the movements of the slides are very small. The guide rods used in carrying out the present invention preferably have a circular cross-section. This renders it easy to treat the outer surfaces of said rods and to impart a high surface quality or finish to them, whereby the friction is further reduced.

These steps, i.e. on the one hand the arrangement in which the frictions are as low as possible, and on the other hand the small mass of the slide to be moved, render it possible to speed up the slides rather quickly, i.e. to bring them within a short path of movement to maximum speed and to attain a high running down velocity of the slide at the same time.

According to a further advantageous embodiment of the invention, in a focal plane shutter having an opening slide and a closing slide, each of which is composed of several individual slides, in each case an individual slide of the opening slide group and of the closing slide group is at the same time guided on and between the same guide rods.

The appended drawings illustrate by way of example some embodiments of and some best modes of carrying out the invention, to which the invention is not limited.

In the drawings

Fig. 1 is a front view of a guide arrangement for rigid shutter slides;

Fig. 2 is a top view of the device shown in Fig. 1;

Figure 3:
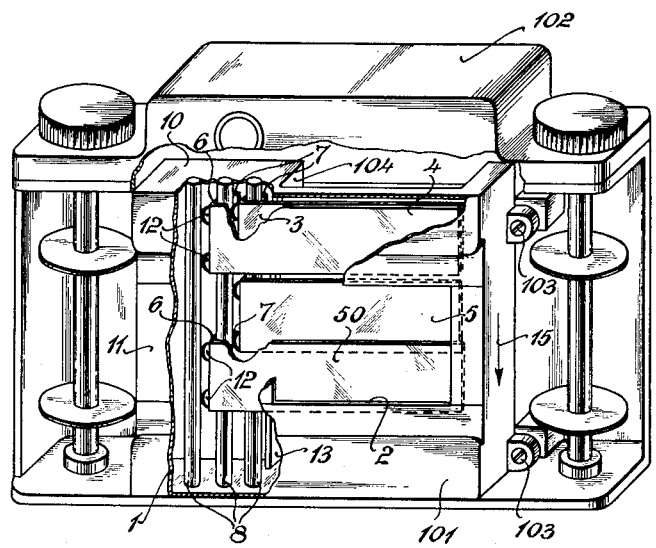
Fig. 3 is a diagrammatical illustration in perspective view of a guide arrangement inserted in a roll film camera.

Referring now to the drawings in detail, in Fig. 1 reference numeral 1 denotes a wall of the casing for housing the parts of the focal plane shutter. The surface 11 of this wall 1 is here at the same time the guideway and the bearing surface for the light-sensitive layer. In wall 1 an image aperture 2 is provided. The shutter members for covering and exposing the image aperture for the passage of light, are rigid slides which form—in a manner known by itself—a group of opening or exposing slides and a group of closing slides. Each of these groups can be formed of two or more individual slides. In Figs. 2 and 3 the group of closing slides, which is composed of two individual slides 3 and 4, is shown in a position in which these two individual slides 3 and 4 are superposed on one side of the image aperture 2.

Reference numeral 5 denotes an individual slide of the group of the opening slides which, in the position shown, together with an additional individual slide 50 covers image aperture 2 to seal it from light. To each of the individual slides 3, 4, 5, and 50 a guide angle member is fastened, one leg of which is formed by a cross-piece member 6 extending over the entire width of the individual slides. On each of the two ends of this member 6 a bent flap 7 is provided, which forms the other leg of the guide angle member. The guide angle members are arranged on and between guide rods 8 which are held in bores 9 of a front wall 10 which is perpendicular to wall 1. With their other ends the guide rods 8 rest in a similar manner in a front wall located on the other side of the image aperture.

To each end of members 6 a sliding contact member 12 is fastened so that each member 6 lies, on the one hand, directly against a guide rod 8 and, on the other hand, by means of its sliding contact members 12 against the adjacent guide rod.

A partition 13 extends between image aperture 2 and the guide rods 8, said partition 13 forming between itself and wall 1 a slot 14 through which the individual slides 3, 4 and 5 project. The width of said slot 14 is selected in such a manner that the individual slides 3, 4 and 5 can move unobstructedly, but are guided at the same time.

During a running down step of the shutter, first the individual slide 5 of the group of opening slides is moved in the direction of arrow 15. Thereby image aperture 2 becomes exposed. The individual slide 5 is followed—earlier or later depending on the shutter time—first by individual slide 3 (of the group of closing slides) which is guided on and between the same guide rods 8 and subsequently the individual slide 4, so that after a running down step of the shutter the individual slides 3 and 4 cover the image aperture in drawn apart but partially still overlapping position, while the individual slide 5 and an additional individual slide 50 which also belongs to the group of opening slides, are located at the lower side (in Fig. 3) of the image aperture in superposed position relative to each other.

In the embodiments illustrated in the drawings the guide rods 8 are shown with circular cross-section. However, the guide rods may have any other cross-section and they can be, for example, of square, rectangular, or triangular cross-section.

In the embodiment shown in Fig. 3 casing 101 which houses the focal plane shutter parts, forms a closed structural unit and is inserted as such in the camera body 102 indicated in Fig. 3 and is fastened therein by means of screws 103. The conventional driving mechanism of the focal plane shutter is arranged in a chamber 104 of the shutter casing 101, beside the image aperture.

Figure 4:
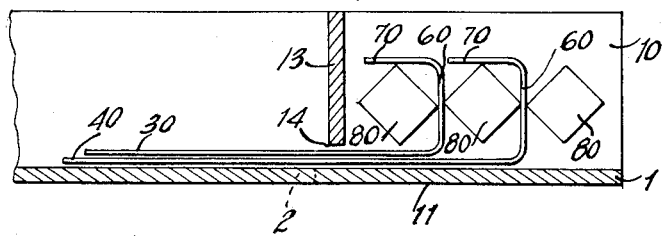
Fig. 4 shows in an illustration similar to that of Fig. 1 a second embodiment of a guide arrangement for the rigid shutter slides.

In the guide arrangement illustrated in Fig. 4 the guide rods 80 have a rectangular cross-section and the individual slides 30 and 40 are provided with bent portions 60 and 70, by means of which they are arranged between guide rods 80. These guide rods can be also of other angular cross-section.

It will be understood from the above that this invention is not limited to the arrangements, designs, steps and other details specifically described above and illustrated in the drawings, and can be carried out with various modifications without departing from the scope of the invention as defined in the appended claims.

What is claimed is:

1. A focal plane shutter for photographic cameras, comprising an image aperture and first rigid slides for exposing and second rigid slides for closing said image aperture; each of said first and second slides being provided with a cross-piece member which is perpendicular to the plane of the slide and with a flap bent in an angle from said member; several guide rods arranged parallel to each other on one side of the image aperture; said cross-piece member being guided between two adjacent guide rods, whereby the flaps span part of the surface of one guide rod only.

2. A focal plane shutter as claimed in claim 1, in which the guide rods are of circular cross-section.

3. A focal plane shutter as claimed in claim 1, in which the guide rods are of angular cross-section.

4. A focal plane shutter as claimed in claim 1, comprising sliding contact mambers fastened to the cross-piece member for engaging guide rods.

5. A focal plane shutter as claimed in claim 1, in which an individual slide of the first rigid slides and an individual slide of the second rigid slides are guided between the same guide rods.

References Cited in the file of this patent
UNITED STATES PATENTS
2,267,794   Kosken ---------------- Dec. 30, 1941